(12) United States Patent
Accetta

(10) Patent No.: US 7,988,163 B2
(45) Date of Patent: Aug. 2, 2011

(54) BALANCE COMPENSATION APPARATUS

(76) Inventor: Roderick W. Accetta, Frederica, DE (US)

( * ) Notice: Subject to any disclaimer, the term of this patent is extended or adjusted under 35 U.S.C. 154(b) by 469 days.

(21) Appl. No.: 12/201,121

(22) Filed: Aug. 29, 2008

(65) Prior Publication Data
US 2009/0058037 A1    Mar. 5, 2009

Related U.S. Application Data

(60) Provisional application No. 60/935,820, filed on Aug. 31, 2007, provisional application No. 61/006,174, filed on Dec. 28, 2007.

(51) Int. Cl.
*B62M 1/00* (2010.01)
*B62B 3/02* (2006.01)
*A61H 3/04* (2006.01)

(52) U.S. Cl. ............... 280/87.05; 280/43; 280/87.021; 280/47.33; 280/47.371; 482/68; 135/67

(58) Field of Classification Search .......... 280/651, 280/655.1, 43, 87.01, 87.021, 87.03, 87.05, 280/47.33, 47.34, 47.371, 282; 482/66, 68; 135/65, 66, 67
See application file for complete search history.

(56) References Cited

U.S. PATENT DOCUMENTS

| | | | |
|---|---|---|---|
| 2,652,097 A | 9/1953 | Warren | |
| 3,180,678 A | 4/1965 | McCabe | |
| 3,847,409 A | 11/1974 | Shaffer | |
| 3,866,945 A * | 2/1975 | Bingham | 280/202 |
| 4,065,145 A | 12/1977 | Chambers | |
| 4,159,110 A | 6/1979 | Dodenhoff | |
| 4,239,248 A | 12/1980 | Ewers | |
| 4,307,715 A | 12/1981 | Fante | |
| 4,657,270 A * | 4/1987 | Allen et al. | 280/7.1 |
| 4,861,051 A | 8/1989 | Napper | |
| 4,867,188 A | 9/1989 | Reid | |
| 5,158,313 A | 10/1992 | Becker | |
| 5,511,809 A * | 4/1996 | Sagi | 280/209 |
| 5,800,317 A | 9/1998 | Accetta | |
| 5,839,740 A * | 11/1998 | Seeger | 280/87.021 |
| 6,070,603 A * | 6/2000 | Politz | 135/67 |
| 6,305,698 B1 * | 10/2001 | Liang | 280/87.041 |
| 6,318,741 B1 * | 11/2001 | Chen | 280/87.041 |
| 6,848,696 B2 * | 2/2005 | Miller | 280/87.021 |
| 7,780,180 B2 * | 8/2010 | Hoepner et al. | 280/267 |
| 2004/0217565 A1 * | 11/2004 | Ramm | 280/87.01 |
| 2006/0033297 A1 * | 2/2006 | Miller | 280/87.021 |

* cited by examiner

*Primary Examiner* — Hau V Phan
*Assistant Examiner* — John R Olszewski
(74) *Attorney, Agent, or Firm* — Arent Fox, LLP

(57) ABSTRACT

The present invention relates to a balance compensation apparatus to be used by persons with one dysfunctional leg and one operative leg. In particular, the invention relates to an apparatus with a frame having at least one lateral support with an aperture for slidably engaging a kneeling platform assembly and a steering column that is mounted on the frame to be offset from a longitudinal centerline of the frame. A handlebar is connected to the steering column. The platform and the handlebar are adjustable for added comfort, control and stability. The platform assembly may be offset of the longitudinal centerline to a side in common with the steering column and have cushions for added comfort. A hand brake may provide stability and safety and the steering column may fold for easy storage.

18 Claims, 8 Drawing Sheets

BALANCE COMPENSATION APPARATUS

This application claims the benefit of U.S. Provisional Application No. 60/935,820 titled BALANCE COMPENSATION APPARATUS, filed Aug. 31, 2007, and U.S. Provisional Application No. 61/006,174 titled BALANCE COMPENSATION APPARATUS II, filed Dec. 28, 2007, which are incorporated herein in their entirety.

BACKGROUND OF THE INVENTION

1. Field of the Invention

The present invention relates to a balance compensation apparatus to be employed by users unable to walk unsupported on their own legs. When using a cane or crutch, the body is subjected to stress that can be discomforting and unsatisfactory to an injured or disabled individual. Wheelchairs and walkers have typically been used to provide support and mobility to non-ambulatory individuals. Other wheeled designs have been employed more recently to aid individuals with a disabled or injured lower limb. The present invention provides enhanced control, comfort and stability over the prior art designs in a wheeled apparatus that provides mobile support and balance compensation to individuals with lower leg, ankle or foot dysfunction.

2. Description of the Related Art

A common feature of the prior art devices is that they exhibit a symmetrical steering control about a longitudinal centerline of the device. This is illustrated in U.S. Pat. Nos. 2,652,097, 3,180,678, 3,847,409, 4,065,145, 4,159,110, 4,239,248, 4,307,715, 4,861,051, 4,867,188, 5,158,313 and 5,800,317. Offsetting the steering control from the longitudinal centerline of a device to be in-line with the centerline of a user may provide enhanced control, comfort and stability for a patient with one dysfunctional leg and one leg having normal functionality.

SUMMARY OF THE INVENTION

It is an object of the invention to provide an improved balance compensation apparatus by providing a steering column with handlebar mounted to a frame of the apparatus in a position offset from the longitudinal centerline of the apparatus. The offset position of the steering column places the steering column in line with the centerline of a user which provides increased comfort, control and stability during operation of the vehicle.

The apparatus includes, among other features, a frame having at least one lateral support with an aperture for slidably engaging an adjustable kneeling platform. A headtube rigidly connects to the frame and a spindle rotatably mounts in the headtube and is connected to a wheel. The steering column is coaxially mounted on the headtube and turns the wheel by way of a steering adapter connected to the steering column and the spindle. The kneeling platform may be offset of the longitudinal centerline to a side in common with the steering column and have cushions affixed thereto for added comfort. A hand brake may be provided for stability and safety. Further, the steering column may fold for easy storage.

BRIEF DESCRIPTION OF THE DRAWINGS

The features of the invention will be more readily understood with reference to the attached drawings, wherein.

DETAILED DESCRIPTION OF THE INVENTION

Figure 1:
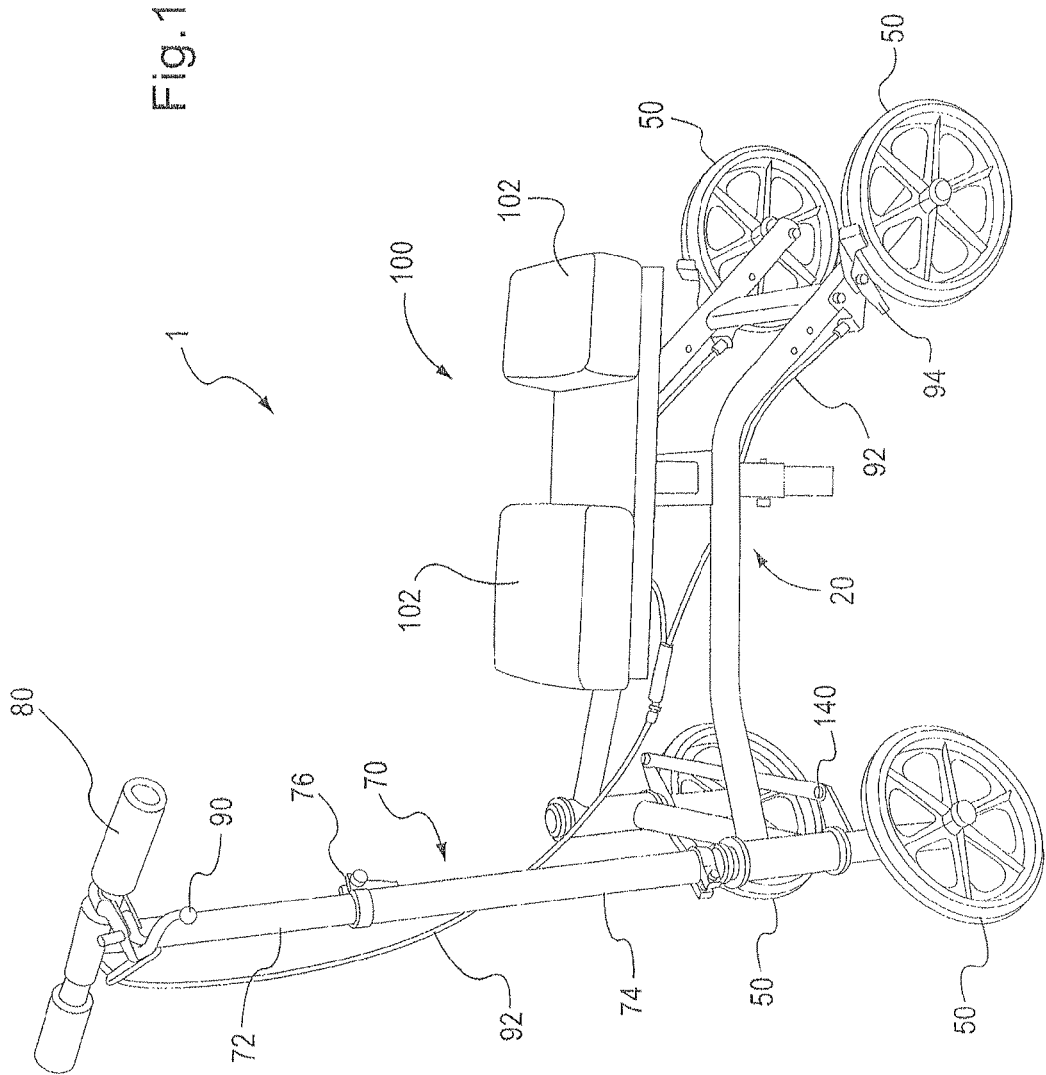
FIG. 1 illustrates a perspective view of a fully assembled balance compensation apparatus.

In the different figures, the same reference numerals designate identical or similar features or components.

Figure 2:
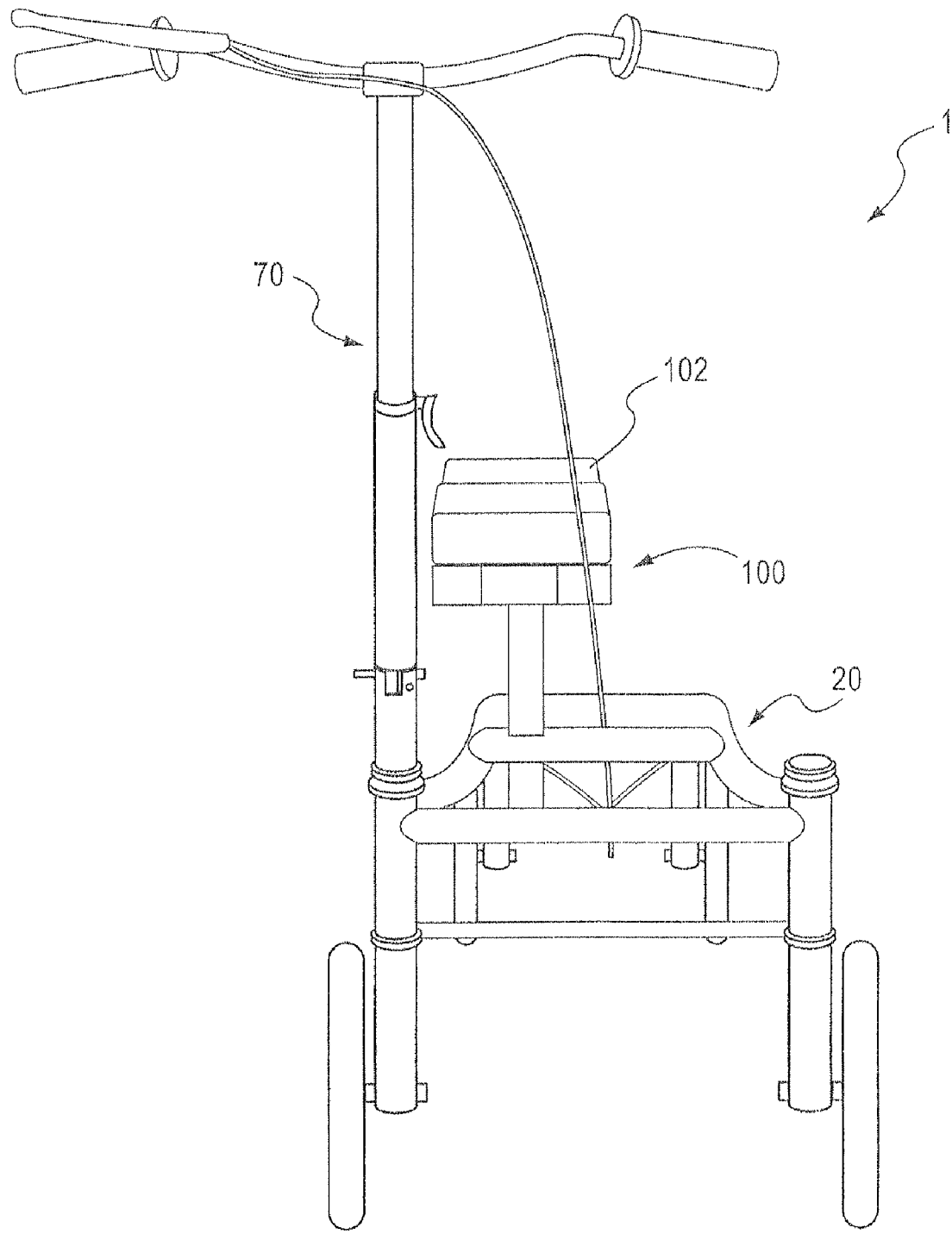
FIG. 2 illustrates a front view of the balance compensation apparatus.

The present invention relates to a balance compensation apparatus, or crutch substitute, having a plurality of wheels for balancing and mobility. FIG. 1 shows a fully assembled balance compensation apparatus 1 with a frame section 20 supported by wheels 50. Although four wheels 50 are shown, the number of wheels may vary according to the level of support and mobility a particular individual may require. A detachable and/or folding steering column 70 may be disposed in-line with a spindle 134 (see FIG. 5) and on the centerline of a user. Handlebars 80 are rigidly and orthogonally connected to the steering column 70 to turn the front wheels 50. A brake lever 90 is mounted on the handle bars 80 and connected by brake cables 92 to dual rear brakes 94. The brake lever 90 may be mounted to either side of the steering column 70 to allow for either right-handed or left-handed control of braking. An adjustable knee platform assembly 100 may be provided in an offset position from the longitudinal centerline of the apparatus 1 to center a user in-line with the steering column 70. The knee platform assembly 100 may be provided with one or more cushions 102 on an upper surface for comfort. As shown in FIG. 2, a user may selectively move the knee platform assembly 100 and the steering column 70 to an offset position from the longitudinal centerline of the apparatus 1 to compensate for the loss of balance depending on the side of a user's injury. As a result, the user is able to steer the apparatus 1 with greater comfort, accuracy, and stability than with the steering column 70 aligned with the center of the apparatus 1.

Figure 3A:
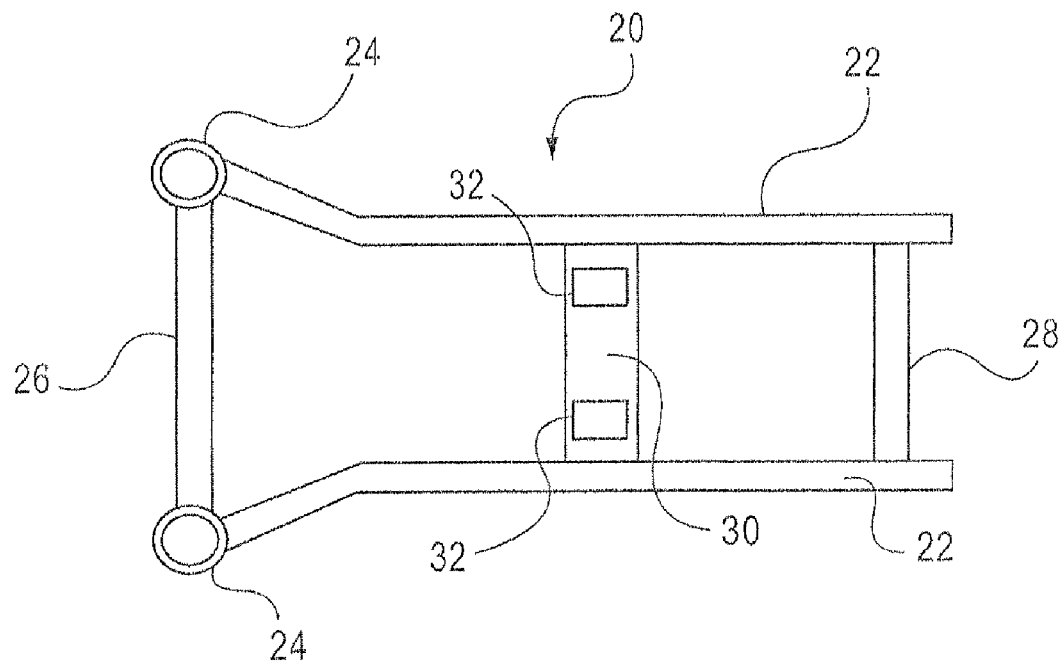
FIG. 3A illustrates a top view of the frame of the balance compensation apparatus and FIG. 3B illustrates a side view of the frame of the balance compensation apparatus.
Figure 3B:
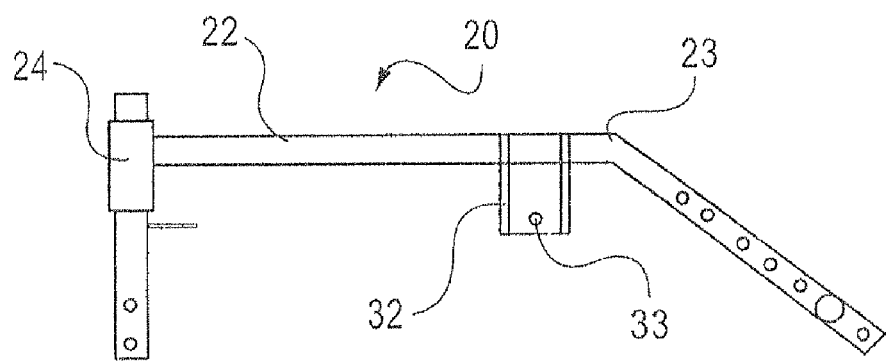

FIG. 3A shows a top view of the frame section 20 comprising side frames 22 rigidly connected at a forward end to head tubes 24. A front lateral support 26 rigidly connects the head tubes 24 at the front of the frame section 20 and a rear lateral support 28 rigidly connects side frames 22 towards the rear of frame section 20. As shown in FIG. 3A, the side frames 22 are slightly bent in a forward portion so that the front lateral support 26 is wider in lateral dimension than the rear lateral support 28. The front wheels are thus positioned wider apart than the rear wheels for increased stability and control during forward movement of the apparatus 1. A platform support beam 30 rigidly connects the side frames 22 at a longitudinally central portion of the frame section 20 between the front lateral support 26 and the rear lateral support 28. As shown in FIG. 3B, a side view of the frame section 20 illustrates that the side frames 22 extend longitudinally rearward from headtubes 24 horizontally parallel to the ground. At section 23 in FIG. 3B, the side frames bend at a predetermined radius of curvature toward the ground until connecting to the rear wheels 50 at distal ends. The frame section 20 may be comprised of steel tubing, for example, or any other suitable material to provide a strong, lightweight and durable structure. The individual components of the frame may be rigidly joined by welding, bolts, or any other suitable means of connecting frame components, as is well known in the art.

As shown in FIGS. 3A and 3B, the platform support beam 30 is formed with platform housings 32 for receiving the stem portion 104 of the knee platform assembly 100 (see FIG. 4). The platform housings 32 extend orthogonally toward the ground from an upper surface of the platform support beam 30. The platform housings 32 provide apertures to slidably fit the stem portion 104. As shown in FIGS. 3A and 3B, there may be multiple platform housings 32 at different positions along the frame width of platform support beam 30 to accommodate multiple user positions. The housings 32 may be rectangular in shape or any other suitable shape to slidably accept a similarly dimensioned platform stem portion 104 of the knee platform assembly 100. The platform housings 32 have at least one through-hole 33 for fastening the knee platform assembly 100 at a desired height according to the user's preference.

Figure 4A:
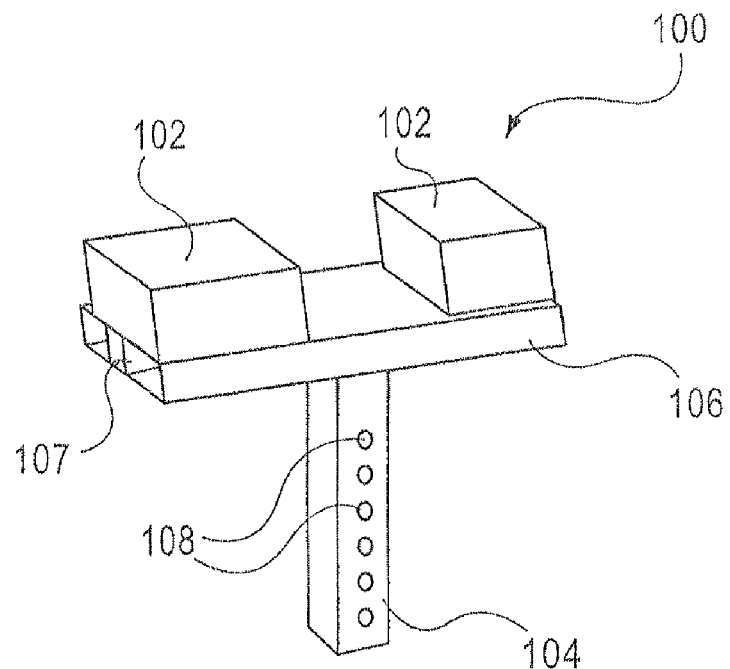
FIG. 4A shows a perspective view of the knee platform of the balance compensation apparatus and FIG. 4B shows a side view of the knee platform and the frame of the balance compensation apparatus.

As shown in FIG. 4A, the knee platform assembly 100 has an upper platform portion 106 positioned horizontally and orthogonally joined to the platform stem portion 104 that extends axially in a vertical direction. The upper platform portion 106 may be hollow with internal struts 107 and composed of any suitable material, such as aluminum, for example, to provide ample structural support while being lightweight. The cushions 102 may be affixed to an upper surface of the upper platform portion 106 by any suitable means, such as tacking, adhesives, or Velcro, for example. The cushions 102 may be adjustable, for example, as desired to establish the comfort of the user. As shown in FIG. 4A, multiple lateral through-holes 108 run along a vertical portion of the platform stem portion 104. The lateral through-holes 108 may be spaced equally apart or arranged in any manner to permit vertical adjustment of the platform assembly 100.

Figure 4B:
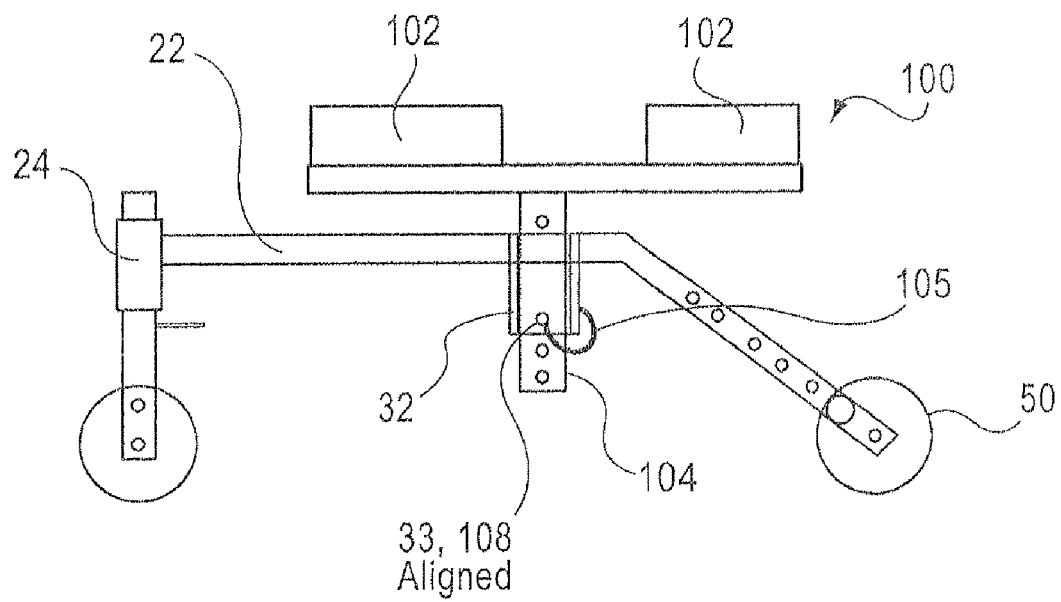

FIG. 4B shows that the knee platform assembly 100 slidably engages a platform housing 32. The platform stem portion 104 is inserted until the upper platform portion 106 is positioned at a desired height and one of the platform stem portion through-holes 108 aligns with the platform housing through-hole 33. A hitch pin with safety spring 105 is inserted through the holes 108 and 33 to lock the knee platform assembly 100 in place. To adjust the knee platform assembly 100 or remove for compact storage, the hitch pin with safety spring 105 is disengaged so that the knee platform assembly 100 may slide to a new position or be completely removed from the platform housing 32. Although a hitch pin with safety spring 105 is described, any means for slidably and adjustably joining the knee platform assembly 100 to the platform housing 32 may be used, including a variety of hitch pin types, a pushbutton adjustment mechanism or a nut and bolt, for example.

Figure 5:
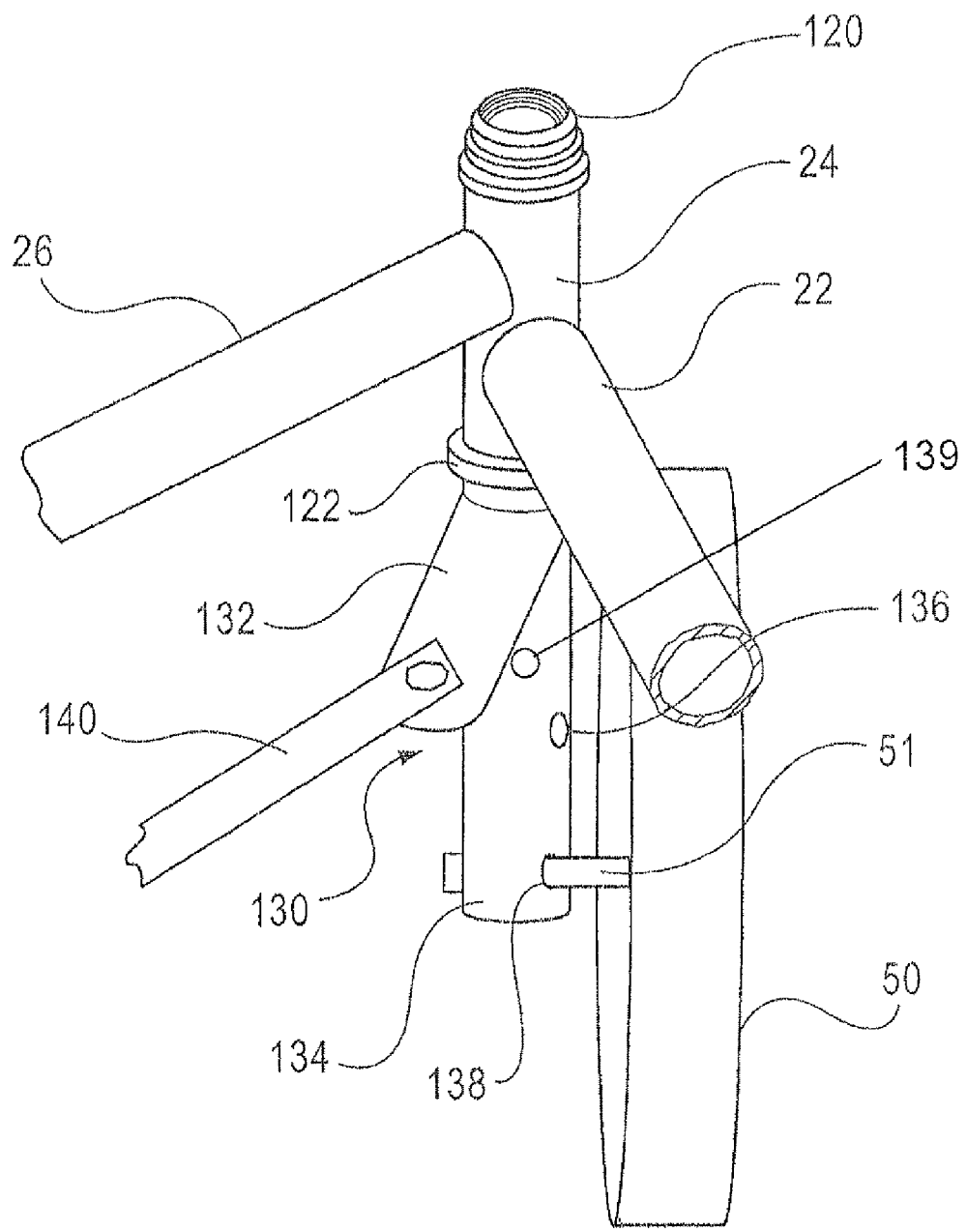
FIG. 5 shows an enlarged view of a headtube and spindle of the balance compensation apparatus.

FIG. 5 shows an enlarged view of a headtube 24 with a threaded headset comprising a threaded upper bearing assembly 120 pressed into the top of the hollow headtube 24 and a lower bearing assembly 122 pressed into the bottom of the hollow headtube 24. A spindle 130 comprising a spindle arm 132 and hollow spindle shaft 134 is rotatably inserted into the headtube 24 through the lower bearing assembly 122 and the upper bearing assembly 120. The spindle shaft 134 has an upper wheel spindle shaft through-hole 136, a lower wheel spindle shaft through-hole 138, and a third spindle shaft through-hole 139 perpendicular to the wheel holes. The upper and/or lower wheel through-holes 136, 138 mount a front wheel axle 51 for attaching the wheel 50. The two holes allow for greater height adjustability and the option of adding different wheels including but not limited to 12" pneumatic wheels. The third spindle shaft through-hole 139 secures the steering shaft adapter 170 (see FIG. 6) to the hollow spindle shaft 134. Axle bearings and axle caps (not shown) are provided to secure the wheel 50 to the spindle 130 and permit free rotation of the wheel 50. A tie rod 140 is connected to both spindle arms 132 of the front wheels 50 so that the front wheels turn in unison.

Figure 6:
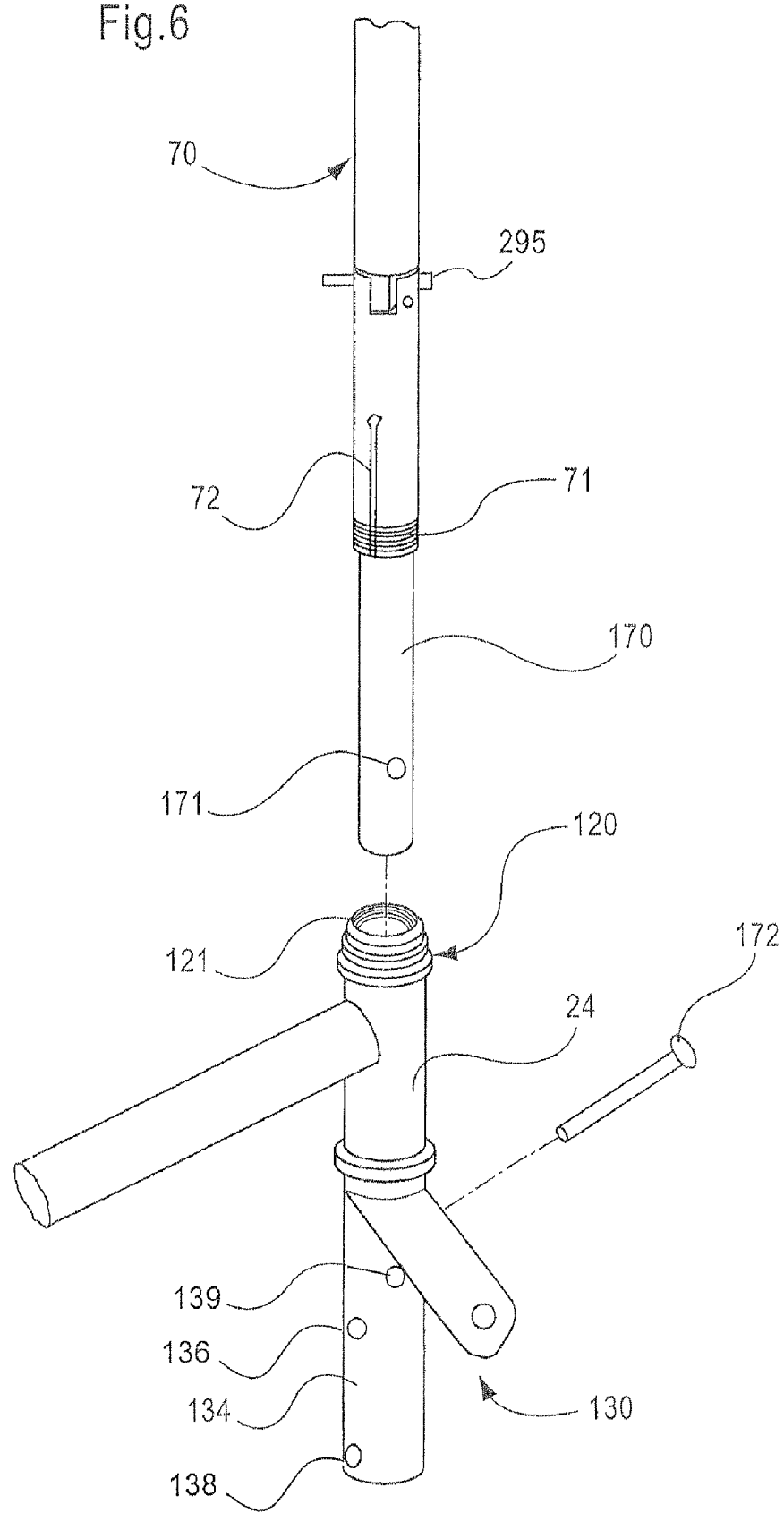
FIG. 6 shows an enlarged view of the steering column connection to the headset and spindle of the balance compensation apparatus.

As shown in FIG. 6, the steering column 70 may have a threaded lower portion 71 for attaching to the threaded upper bearing assembly 120 on the headtube 24. A steering shaft adapter 170 with through-hole 171 slides into the hollow spindle shaft 134 until through-hole 171 aligns with the third spindle shaft through-hole 139. The outside diameter of adapter 170 must be slightly smaller than the inside diameter of the hollow spindle shaft 134 to freely fit into the hollow spindle shaft 134. A hitch pin with safety spring 172 extends through the aligned through-holes 171 and 139 to lock the steering shaft adapter 170 to the spindle 130. The steering column 70 slides down over an upper portion of the steering shaft adapter 170 until the threaded lower portion 71 of the steering column 70 is received into the threaded upper bearing assembly 120. The threaded lower portion 71 of the steering column 70 has a slot 72 that is formed so that when the lock nut 121 of the threaded upper bearing assembly 120 is tightened, the threaded lower portion 71 is compressed and clamps onto the steering shaft adapter 170. In an alternative embodiment, a ring clamp (not shown) is provided around the lower portion 71' (not shown) that, when engaged and tightened, compresses the lower portion 71' to clamp onto the steering shaft adapter 170 by way of slot 72. The lower portion 71' may not be threaded and may engage an upper bearing assembly 120' (not shown) that may not be threaded. In all aspects, the steering column 70 is rigidly connected to the spindle 130 through the steering shaft adapter 170 so that when a user turns the handlebars 80, the steering column 70 rotates by way of the upper bearing assembly 120 and turns the steering shaft adapter 170, which, in turn, rotates the spindle 130. As described previously, the spindles 130 are connected by tie rod 140 so that both front wheels 50 will turn in unison regardless of which side of the frame 20 the steering column 70 is mounted. The wheels are limited to turn up to 90 degrees, stop to stop, and 45 degrees from center, thereby eliminating the danger of over-steering, yet maintaining balance and stability.

Figure 7:
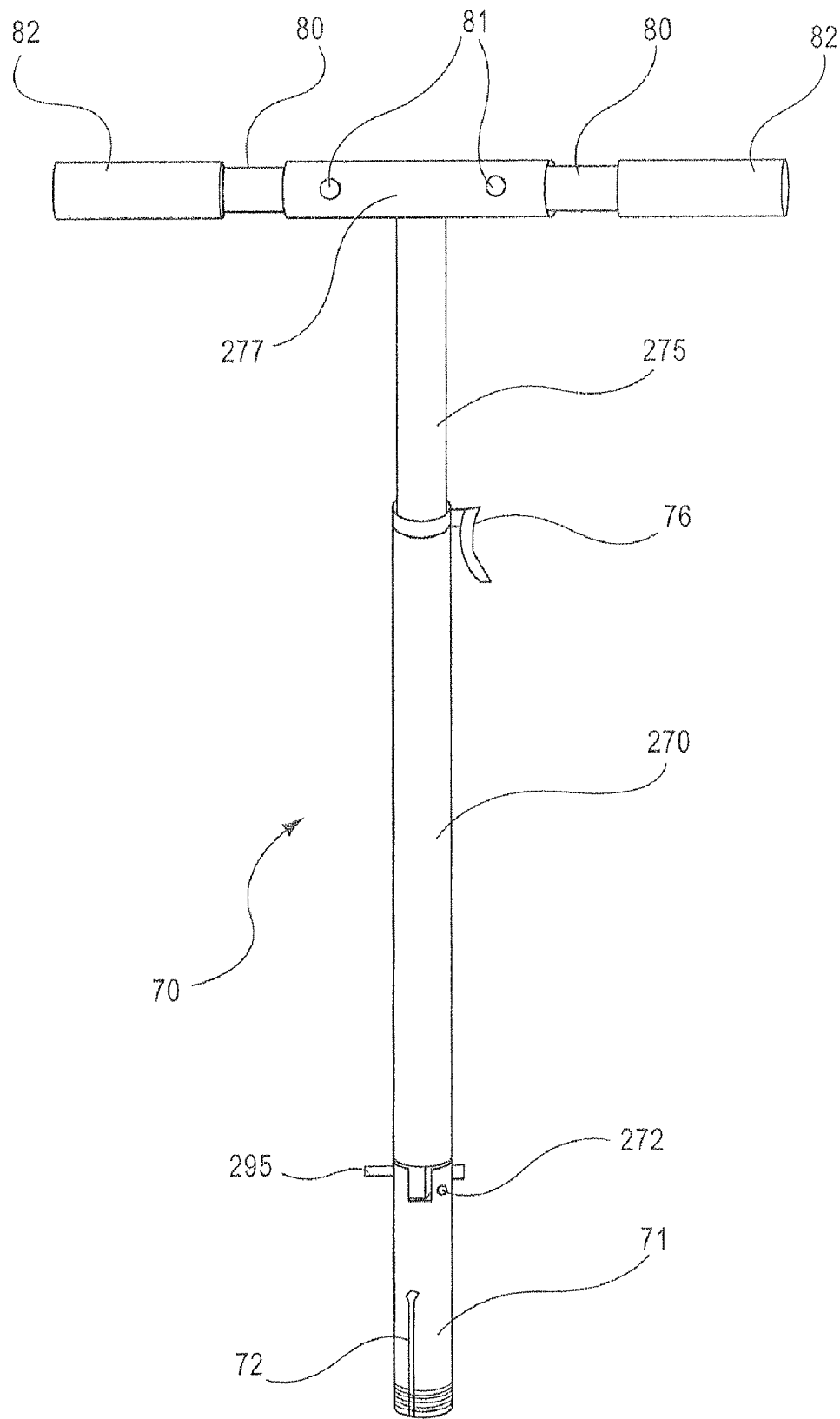
FIG. 7 shows an enlarged view of the steering column of the balance compensation apparatus.

As shown in FIG. 7, the steering column 70 comprises a threaded lower portion 71, a primary steering post 270, and an adjustable upper steering post 275. The adjustable upper steering post 275 includes a handlebar housing shaft 277 joined or formed orthogonally to the axis of the upper steering post 275. The handlebar housing shaft 277 has holes 278 for receiving spring-loaded pushbuttons on the handlebars 80. Multiple holes may be formed in the handlebar housing shaft 277 to accommodate extension of the handlebars 80 to different positions, for example. The handlebars 80 may easily be removed for compact storage and/or transportation or reinserted by pressing the spring-loaded pushbutton and sliding the handlebars 80 into or out of the handlebar housing shaft 277. The handlebars 80 may have foam grips 82 provided on an exterior circumferential surface for the comfort and grip of the user.

The upper steering post 275 has an outer diameter smaller than that of the hollow primary steering post 270 in order to slidably insert into the primary steering post 270. The upper steering post 275 is slid into primary steering post 270 until the handlebars 80 reach a desired height. A ring clamp 76 on the top of the primary steering post 270 is tightened and clamped to lock the steering post 270 in position. Alternatively, spring-loaded pushbuttons (not shown) may be provided on an outer surface of the upper steering post 275 to engage holes (not shown) in the primary steering post 270 for easy height adjustment of the handlebars 80.

Figure 8A:
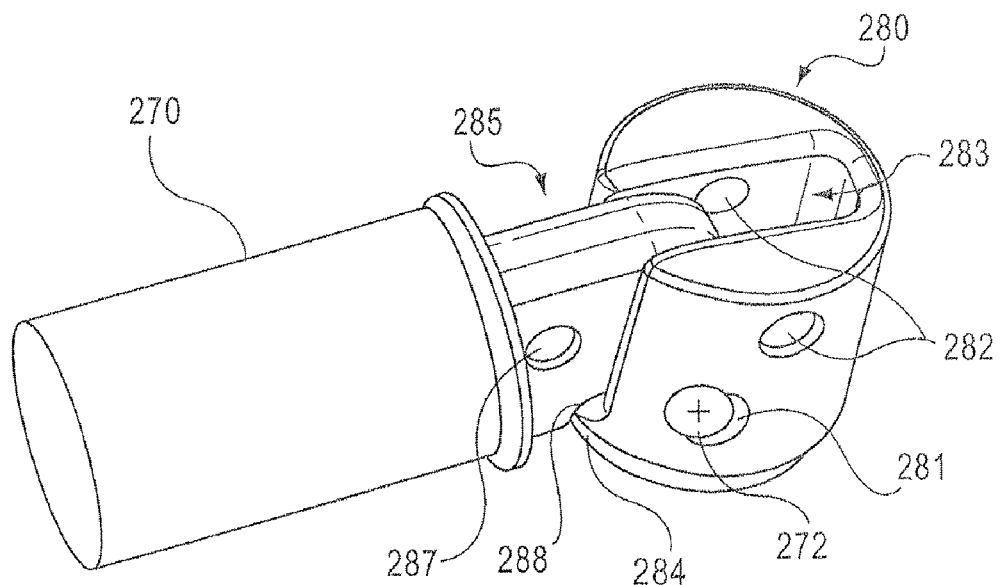
FIGS. 8A-8C show enlarged views of the pivot hinge for folding the steering column of the balance compensation apparatus.

The primary steering post 270 is pivotally connected to the threaded lower portion 71 by a pivot pin 272. The steering column 70 may pivot freely in a rearward motion about the pivot pin 272. As shown in the enlarged FIGS. 8A-8C, the top of the threaded lower portion 71 may include a pivot seat 280. The pivot seat 280 has a notched area 283 in the top of the shaft of the threaded lower portion 71 for receiving the pivot arm 285 formed or joined on a lower free end of the primary steering post 270. The notched area 283 is open on one side to permit the pivot arm 285 to fold down from a vertical locked position. The pivot seat 280 has a lateral pivot through-hole 281 that extends through the notched area 283. The pivot arm 285 has a through-hole 286 that aligns with the pivot seat through-hole 281 to pivotally connect the two members using the pivot pin 272.

Figure 8B:
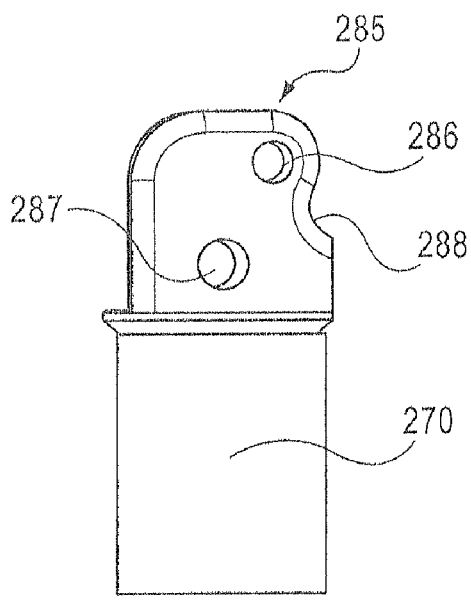
Figure 8C:
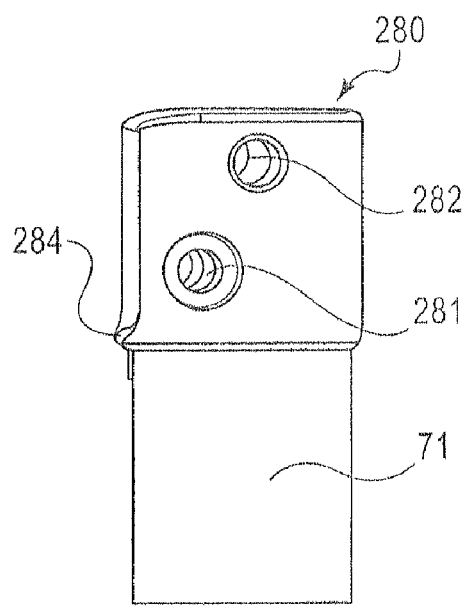

When the steering column 70 is pushed upright to the operational position, the lower threaded portion 71 and the primary steering post 270 are coaxially aligned. The closed rear surface of the notch area 283 prevents the pivot arm 285 from rotating past the operational position. A fold hitch pin 295 with safety spring may be inserted through an upper through-hole 282 in pivot seat 280 and an upper through-hole 287 in the pivot arm 285 to lock the steering column in place in the upright vertical position (see FIG. 7). To fold the steering column 70, a user simply disengages the fold hitch pin 273 and lays the steering column 70 down toward the rear of the apparatus 1. As shown in FIGS. 8B and 8C, the pivot arm 285 is specially formed with detent 288. The detent 288 mates with the lip 284 on the pivot seat 280 to limit the range of rotation of the steering column when placed into a storage, or folded, position.

To use the balance compensation apparatus 1, a user first selects on which side, when viewed longitudinally facing forward, to mount the knee platform assembly 100 and the steering column 70 to the frame 20. Preferably, the primary caregiver may set up the apparatus 1 for patient use. For example, a patient with lost mobility due to injury to a right leg would mount the knee platform assembly 100 in a platform housing 32 on the left side of the frame 20. As described above, the knee platform assembly 100 would be adjusted to a preferred height providing the most control and comfort for the patient in using their operative leg to propel the apparatus 1 forward. The steering column 70 would be mounted to the left headtube 24 as described above, so that when the user is kneeling on the knee platform 100, or otherwise using the knee platform 100 for support, the steering column and the centerline of the user are in-line. The user is propelled forward by pushing with their operative leg while steering the apparatus 1 with the handlebars 80. The user steers the apparatus 1 through a ninety degree range of motion, forty five degrees to the right and forty five degrees to the left, while moving forward. As described above and shown in FIG. 1, both front wheels 50 are connected by tie rod 140 so as to turn in unison. For inclines and declines, or simply to stop or hold the apparatus 1 in place, the user squeezes the brake lever 90 which pulls the brake cables 92 to simultaneously engage the dual rear brakes 94. The dual rear brakes are mounted on the side frames 22 and apply pressure to the rear wheels 50 to slow or stop the motion of the balance compensation apparatus 1.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language in the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The scope of protection is limited solely by the claims that now follow. That scope is intended to be as broad as reasonably consistent with the language that is used in the claims and to encompass all structural and functional equivalents.

What is claimed is:

1. A balance compensation apparatus, comprising:
   a platform;
   a frame having a longitudinal centerline and at least one lateral support with an aperture for slidably engaging the platform;
   a headtube rigidly connected to the frame;
   a front wheel;
   a spindle rotatably mounted in the headtube and connected to the front wheel;
   a steering column offset from the longitudinal centerline of the frame and coaxially mounted on the headtube;
   a steering adapter connected to the steering column and the spindle for turning the front wheel; and
   a handlebar connected to the steering column.

2. The balance compensation apparatus of claim 1, wherein the aperture is offset from the longitudinal centerline of the frame.

3. The balance compensation apparatus of claim 2, wherein the steering column is offset from the longitudinal centerline of the frame on a side in common with the aperture.

4. The balance compensation apparatus of claim 1, further comprising a bearing assembly mounted in the headtube, wherein the steering column further comprises a lower portion for engaging the bearing assembly.

5. The balance compensation apparatus of claim 4, wherein the bearing assembly is a threaded bearing assembly and the lower portion of the steering column is threaded to engage the threaded bearing assembly.

6. The balance compensation apparatus of claim 4, wherein the steering column further comprises a primary steering post and an upper steering post, wherein the primary steering post is pivotally connected to the lower portion of the steering column and the upper steering post is slidably inserted into the primary steering post and connected to the handlebar.

7. The balance compensation apparatus of claim 6, further comprising a ring clamp, wherein the upper steering post is slidably inserted into the primary steering post and clamped to the primary steering post by the ring clamp to adjust the handlebar.

8. The balance compensation apparatus of claim 6, wherein the handlebar is slidably removable from the upper steering post.

9. The balance compensation apparatus of claim 6 having a pivot pin and a fold hinge pin, wherein the primary steering post further comprises a pivot arm and the lower portion of the steering column further comprises a pivot seat, wherein the upper steering post is pivotally connected to the lower portion by the pivot pin extending through the pivot arm and the pivot seat, and the steering column is locked in an upright position by extending the fold hinge pin through the pivot arm and the pivot seat.

10. The balance compensation apparatus of claim 1, wherein the steering column further comprises a slotted lower portion and a ring clamp for connecting the steering column to the steering adapter by tightening the ring clamp to compress the slotted lower portion and clamp the slotted lower portion to the steering adapter.

11. The balance compensation apparatus of claim 1, wherein the front wheel is limited to turn up to forty five (45) degrees from the longitudinal centerline of the frame.

12. The balance compensation apparatus of claim 1 having a hitch pin, wherein the steering adapter further comprises at least one adapter aperture and the spindle further comprises at least one spindle aperture, wherein the steering adapter is connected to the spindle by extending the hitch pin through the at least one adapter aperture and the at least one spindle aperture.

13. The balance compensation apparatus of claim 1 having a platform hitch pin, wherein the at least one lateral support further comprises a platform housing having at least one platform housing through-hole, wherein the platform further comprises a platform stem portion having at least one platform stem portion through-hole, and wherein the platform is adjustably connected to the frame by extending the platform hitch pin through the at least one platform housing through-hole and the at least one platform stem portion through-hole.

14. The balance compensation apparatus of claim 1, further comprising a second front wheel, a second spindle and a tie rod, wherein the tie rod is connected to the spindle and the second spindle for turning the front wheel and the second wheel in unison.

15. The balance compensation apparatus of claim 1, further comprising at least one rear wheel attached to the frame.

16. The balance compensation apparatus of claim 15, further comprising a brake lever attached to the handlebar and a rear brake, wherein pressure is applied to the at least one rear wheel by the rear brake when the brake lever is squeezed.

17. The balance compensation apparatus of claim 1, wherein the platform is comprised of aluminum.

18. The balance compensation apparatus of claim 1, wherein at least one cushion is affixed to an upper surface of the platform.

* * * * *